Figure 3:
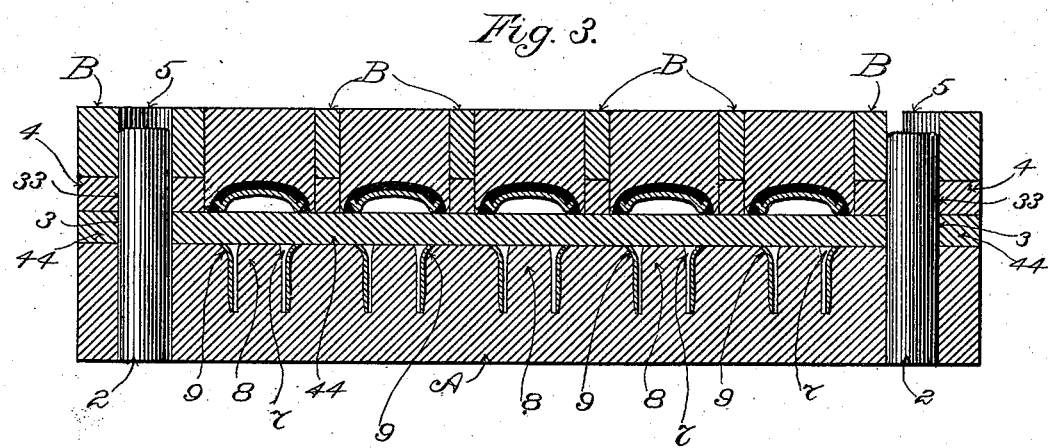

(No Model.) 2 Sheets—Sheet 1.
A. C. ESTABROOK.
DEVICE FOR COVERING LACING HOOKS WITH PLASTIC MATERIAL.
No. 576,046. Patented Jan. 26, 1897.
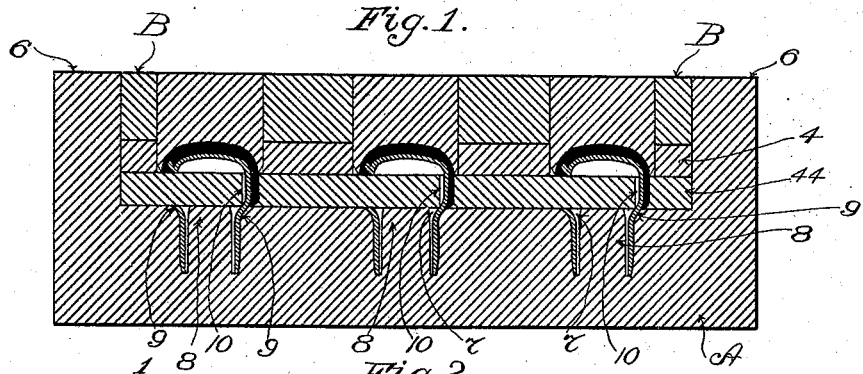
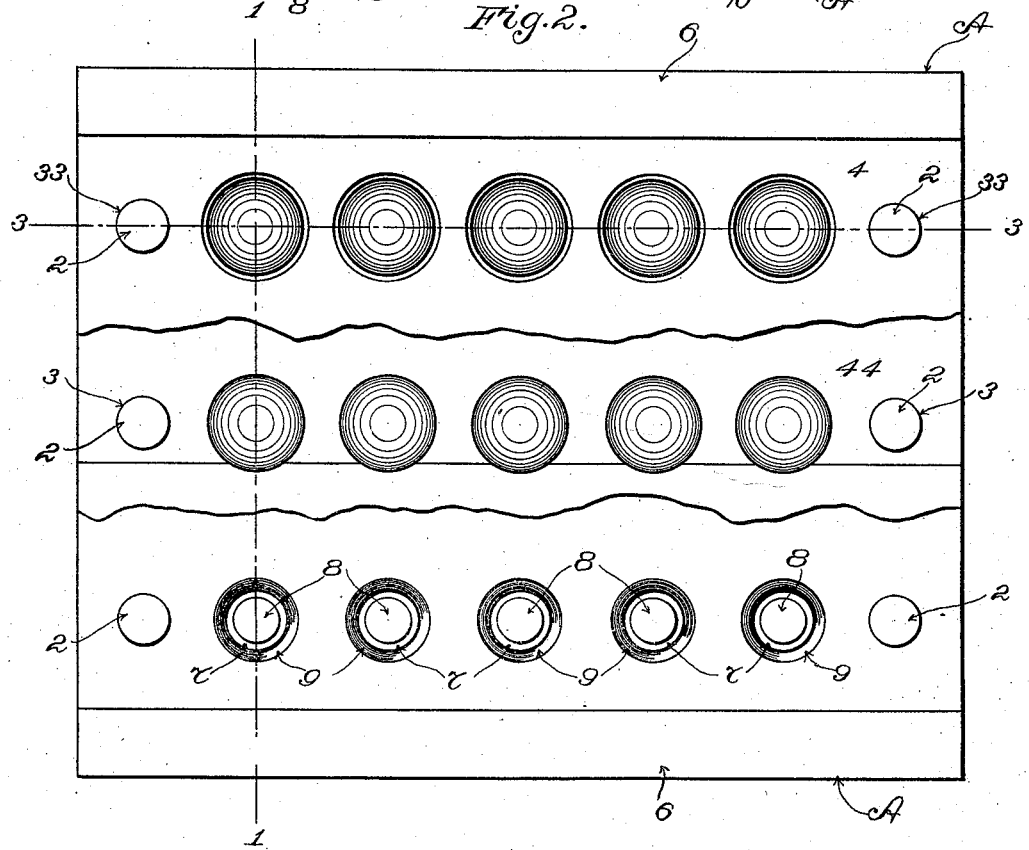
Witnesses:
Oscar F. Hill
Robert Wallace
Inventor:
Alanson C. Estabrook
by Macleod Calver & Randall
Attorneys.

(No Model.) 2 Sheets—Sheet 2.

A. C. ESTABROOK.
DEVICE FOR COVERING LACING HOOKS WITH PLASTIC MATERIAL.

No. 576,046. Patented Jan. 26, 1897.

Witnesses:
Oscar F. Hill.
Robert Wallace.

Inventor:
Alanson C. Estabrook
by Macleod Calver Randall
Attorneys.

UNITED STATES PATENT OFFICE.

ALANSON C. ESTABROOK, OF NORTHAMPTON, MASSACHUSETTS.

DEVICE FOR COVERING LACING-HOOKS WITH PLASTIC MATERIAL.

SPECIFICATION forming part of Letters Patent No. 576,046, dated January 26, 1897.

Application filed May 25, 1896. Serial No. 593,058. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Covering Lacing-Hooks with Plastic Material, of which the following is a specification, reference being had therein to the accompany10 ing drawings.

My invention has for its object to provide an improved die mechanism for use in molding coverings of plastic material upon lacing-hooks in order to produce what are termed "covered" lacing-hooks.

The invention is fully set forth in the following description, and the novel features thereof are particularly pointed out and clearly defined in the claims at the end of this specifi20 cation.

In the accompanying drawings, to which reference is made in the following description, Figure 1 is a vertical section showing a die mechanism embodying my invention, the covered hooks being shown in section in position in the dies. Fig. 2 is a plan view of a device such as is shown in Fig. 1 with the upper dies removed. In the middle portion of the said figure the lower die-plate is broken away, showing the covered hooks in position with the said lower die-plate removed. In the lower portion of said Fig. 2 the said lower die-plate and the underlying hook-holding strip are broken away, showing the base-plate containing the recesses in which the barrels of the lacing-hooks are placed prior to the operation of molding. Fig. 3 is a section on line 3 3 of Fig. 2.

It is desirable in producing covered lacing40 hooks to reduce the handling of the hooks by the operator to a minimum, since the handling of the hooks, especially if they are covered with plastic material of a delicate color, is apt to soil them, and regardless of the color the handling of the hooks deadens the luster given the covering material in the molding operation by the action of the dies. The handling of the hooks is further to be avoided, because it increases the expense of produc50 tion. I avoid the objections above referred to and reduce the handling of the hooks to a minimum by the employment of my invention hereinafter set forth, and am enabled to produce a mechanism for effecting the operation of covering lacing-hooks which is efficient and durable, and by employment of which the expense of the covering operation is greatly reduced.

Having reference to the accompanying drawings, A is a base-plate formed from a flat plate of metal and of a size sufficient to provide for a number of dies equal to the number of hooks which it is desired to cover at one operation. The said plate A is provided, preferably, at each end thereof with guide-pins 2, which pass into holes 3 in the hook-holding strips 44 and holes 33 in the lower die-plate 4, and serve to properly position the said strips and plate. The said guide-pins 2 also are of sufficient length to pass into holes 5 in the upper die-plate B. By this means the four parts of the device may be caused to register properly when brought together to effect the molding operation.

The base-plate A is provided, preferably, with an upwardly-projecting ledge or series of projections 6, located at each side thereof, and which serve to properly confine and locate the hook-holding strips 44 and lower die-plate 4. The said projection 6 may, however, be varied in form or omitted, if each of said strips is properly held by means of guide-pins 2, above described. The precise means employed for causing the parts of the device to register are immaterial, and any well-known means of properly positioning the parts may be employed.

The base-plate A is provided with a series of holes or sockets 7, each of a size adapted to receive the barrel of a hook, and within each of said holes or sockets 7 I employ, preferably, a pin 8, which extends upwardly, so that the top thereof is flush with the upper surface of the said plate A. The said pins 8 are of less diameter than the sockets or holes in which they are contained, thus affording a sufficient space around each of said pins 8 for the insertion of the barrel of a hook. The pins 8 I deem desirable not only for the purpose of assisting to center and hold the hook, but also as to support the hook-holding strips, since the said pins are located directly underneath the crowns of the hooks and serve to support the hook-holding strips at the points where the pressure of the upper dies is applied. The hook-holding strips, if made of considerable thickness, will not require to be reinforced or supported by the said pins 8. When, also, the sockets or holes 7 are formed of a sufficient diameter to fit the barrels of the hooks, so that the holes 7 will properly position the hooks without the aid of the pins 8, the pins 8 may be omitted. I therefore do not consider them as essential to my invention. The top of each of the holes or sockets 7 is preferably countersunk or formed with a flaring mouth, as shown at 9, to accommodate the flange at the top of the barrel of the hook. The flaring mouth also serves to guide the barrel of the hook when the latter is being inserted in the socket or hole 7. The hooks are held by means of the hook-holding strips 44, the said strips 44 being wider than the longest diameter of the crown of the hook. In the drawings the hooks are shown with circular crowns, but my invention is equally adapted to hooks having crowns which are other than circular in contour. The hooks are placed on one edge of the said hook-holding strip 44, the said strip centering the mouth of the hook and filling the space between the crown thereof and the top of the barrel. The edge of the said hook-holding strip on which the hooks are placed is provided with a series of curved recesses or notches 10, one for each of the hooks. These recesses 10 receive the necks of the hooks.

The hook-holding strips 44 are placed side by side on the plate A, each strip serving for a row of hooks, and the edge of each strip opposite that upon which the hooks are placed serves as a backing or wall against which the plastic material which covers the necks of the hooks upon the next adjoining hook-holding strip is molded. In this way the thickness of the covering which is molded on the neck of the hook may be determined, since if a thicker covering is required provision may be made for it either by recessing the edge of the strip or by increasing slightly the depth of the recess 10 in the adjoining strip. It is obvious that instead of utilizing the adjacent hook-holding strip as a backing for the plastic material, if the holding-strips are too far apart for that purpose, a special strip can be used for the backing, either extending the entire length or in short sections, and either detachable or fixed to the base-plate.

The crown of the hook extends over the upper surface of the hook-holding strip 44, as shown. The lower die-plate 4 is placed on top of the hook-holding strips 44, as shown, Fig. 1, and said plate is provided with an opening or aperture for each hook, said opening being preferably of substantially the same shape as the crown of the hook, but somewhat larger. The plate 4 is of sufficient thickness, so that its upper surface will be flush with or slightly above the highest portion of the molded material upon the crown of the hook. When the lower die-plate 4 is in position, the crowns of the hooks are each in a cavity. A piece of plastic material which is used in covering the hooks is then placed in each of these cavities on the crown of the hook therein, the cavity also serving to properly locate the material, and the upper die-plate B, which contains a series of dies corresponding in position with the cavities in the lower die-plate, is then brought into position on top of the lower die-plate, and by the aid of heat and pressure the plastic material is molded over the crowns of the hooks or over the crowns and necks, if it is desired to cover the necks. The operative faces of the upper dies are shaped to correspond with the shape which it is desired to give the molded covering. After the molding operation the upper die-plate B is removed, as also the lower die-plate 4, after which the hook-holding strips 44 may be removed from the base-plate, the covered hooks remaining on the edge of each strip. These covered hooks are thus in position to be placed on a suitable pin-board or board having cavities to receive the barrels of the hooks, and by moving the said strip sidewise it may be removed from the mouths of the hooks and the hooks left in position on the pin-board or recessed board ready for inspection or for any further finishing operation which may be necessary.

The hook-holding strips 44 may be filled with hooks ready to be covered either by hand or by the employment of a machine provided for this purpose. I contemplate the filling of these strips by machine. By the employment of a number of hook-holding strips they may be filled and placed on racks or other suitable holding devices, where they may be readily taken by the operator using the dies and placed in position on the base-plate A, the empty strips after the molding operation being returned to the filling machine to be again filled. After the hook-holding strips 44, which have been filled with hooks, are in position on the base-plate A the lower die-plate is placed over said strips, and the covering material may be placed in the cavities or openings of the lower die-plate 4 on the crowns of the hooks ready for the molding operation, either by taking the separate pieces of covering material which have been cut to the proper size and placing them in each die or the pieces of covering material may be placed in the cavities or openings of the lower die-plate 4 directly from the machine by which they are cut to shape. This latter method I prefer. It will be noted that the lower die aperture or cavity serves to locate the piece of material which is to be molded on the crown of the hook properly with reference to said crown, so that the pieces of molding material may be very quickly and easily placed in position.

In the use of the molding-dies hereinabove described the metal hooks may be quickly filled onto the hook-holding strips by a machine provided for the purpose, and by the employment of a considerable number of these strips the operator who uses the dies may be kept constantly employed without necessitating any delay in the operations, and the said hook-holding strips, when removed after a molding operation, serve as a means of quickly removing a large number of covered hooks from the dies and placing them in a position to be inspected or subjected to further finishing operations. The arrangement of the parts of the device is such that the operations necessary in covering a series of hooks may be quickly and accurately performed, and the hooks are positively held and cannot be misplaced, so that the percentage of poor work is reduced to a minimum.

For the above reasons in particular the construction and arrangement of my device is such that it lends itself readily to the manufacture of covered hooks by the use of a minimum of hand-labor, rendering the operation speedy and freeing it from the objections which exist to the handling of the goods, while also reducing the cost and improving the quality of the article produced.

What I claim is—

1. A device for covering lacing-hooks with plastic material comprising a base-plate having a series of openings therein with guiding and supporting pins in said openings, a series of hook-holding strips, one edge of each strip being provided with a series of recesses each adapted to receive the neck of a hook, the opposite edge of said strip serving as a retaining-wall in molding the plastic material around the necks of the hooks on the adjoining strip, a lower die-plate having a series of apertures therein for the crowns of the lacing-hooks on the hook-holding strips and an upper die-plate having a series of upper dies, substantially as set forth.

2. In a device for covering lacing-hooks with plastic material, the combination with an upper die-plate having a series of upper dies therein, of a base-plate having a series of sockets or openings therein to receive the barrel of the hook, a series of hook-holding strips having recesses at one side thereof to receive the necks of a series of hooks and the lower die-plate placed above said hook-holding strips and having a series of openings therein for the crowns of the hooks on the hook-holding strips, said hook-holding strips being placed side by side, the edge of one strip forming the backing for the plastic material which is molded on the necks of the hooks on the adjoining strip, substantially as set forth.

In testimony whereof I affix my signature in presence of two witnesses.

ALANSON C. ESTABROOK.

Witnesses:
GEORGE H. RAY,
HOMER C. BLISS.